Aug. 14, 1923.

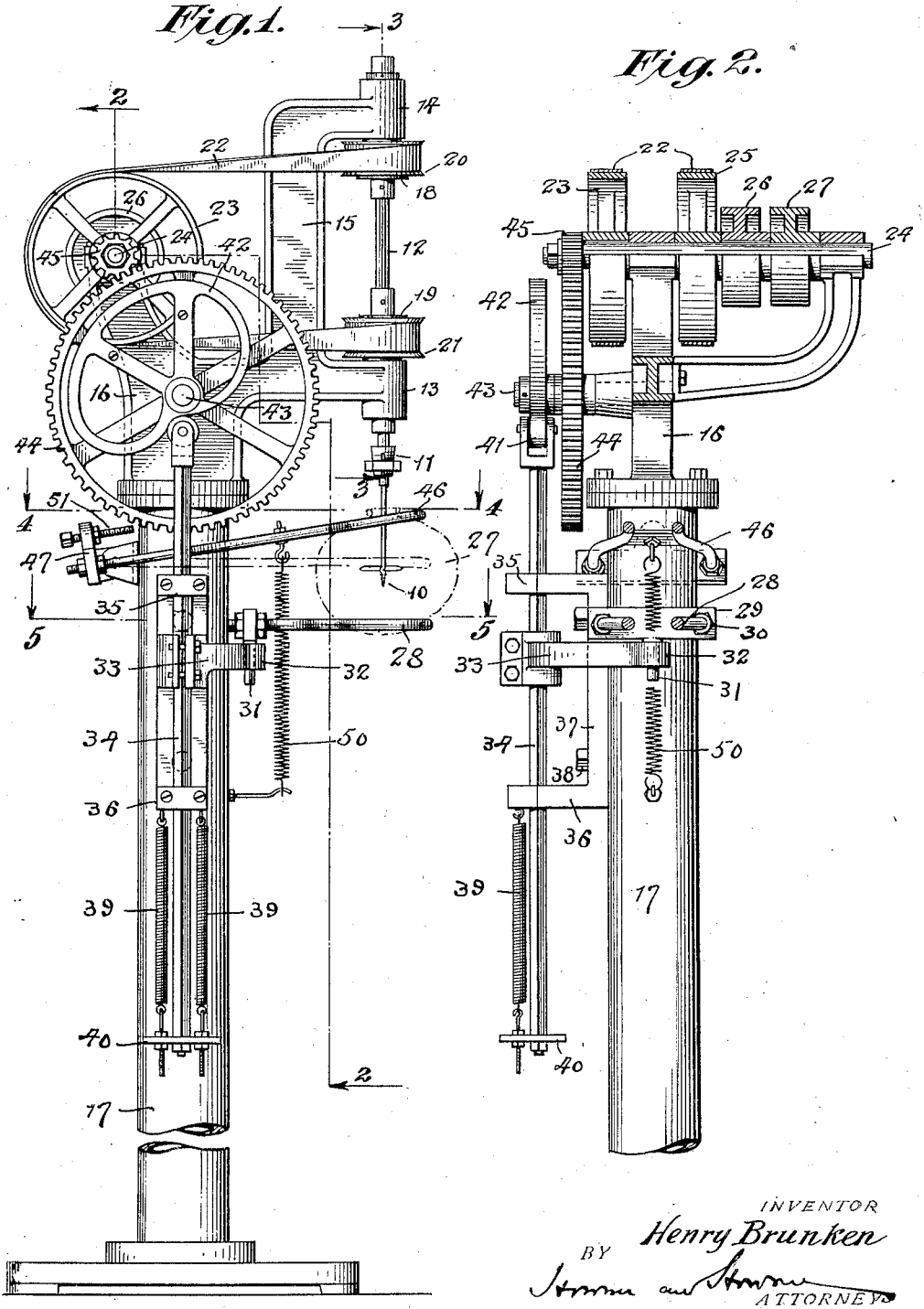

H. BRUNKEN 1,465,113

CUTTING MACHINE

Filed Oct. 21, 1921  2 Sheets-Sheet 2

INVENTOR
Henry Brunken
BY
ATTORNEYS

Patented Aug. 14, 1923.

1,465,113

UNITED STATES PATENT OFFICE.

HENRY BRUNKEN, OF BROOKLYN, NEW YORK.

CUTTING MACHINE.

Application filed October 21, 1921. Serial No. 509,384.

*To all whom it may concern:*

Be it known that I, HENRY BRUNKEN, a citizen of the United States of America, residing in the city of New York, borough of Brooklyn, county of Kings, and State of New York, have invented certain new and useful Improvements in Cutting Machines, of which the following is a specification.

My invention relates to cutting machines, and particularly to a machine having a double acting rotary cutter. The apparatus is particularly designed for cutting cores of cabbages, but may be used for any other purpose for which it is adapted. The object of my invention is to improve the operation of the machine in certain features hereinafter pointed out or shown in the accompanying drawings, in which—

Figure 3:
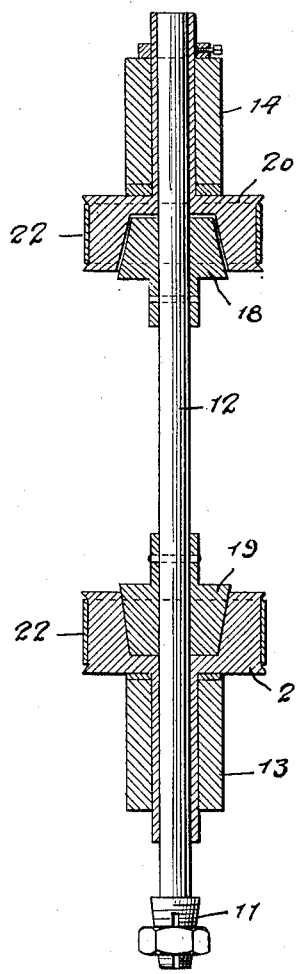
Figure 4:
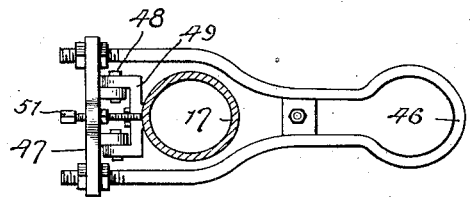
Figure 5:
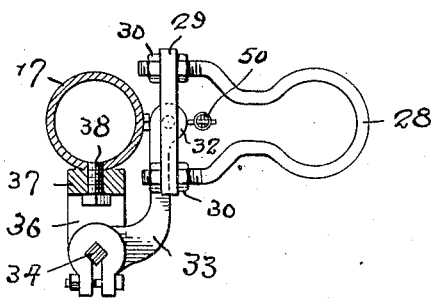

Fig. 1 is a side elevation of a machine in which my invention is embodied in one form; and Figs. 2 to 5 inclusive are sections on the lines 2—2, 3—3, 4—4 and 5—5, Fig. 1, respectively.

In a cutter of the present type, which is particularly designed for the cutting of cabbage cores in the manufacture of sauerkraut, it has heretofore been customary to handle the article operated on, for instance cabbage, by manually supporting the cabbage and lifting it and lowering it with relation to the cutter as the latter bores into and slices the cabbage core. This imposes a very heavy burden upon the operator, since the cabbages often weigh eight or ten pounds, and the effort required to handle them is extremely fatiguing. The present machine is designed to relieve the operator from much of the burden of manual operation.

In the form here shown, the cutter 10 is held in a chuck 11 at the foot of the vertical spindle 12, journalled in the upper and lower bearings 13 and 14 of a bracket 15 on the head frame 16, which in turn is supported upon a pedestal 17 of any suitable construction. The vertical spindle 12 is longitudinally displaceable in the bearings 13 and 14, and carries clutch cones 18 and 19 cooperating respectively with the oppositely rotating pulleys 20 and 21 driven by a common belt 22 from the main driving pulley 23. The latter is fast on the driving shaft 24, while the other pulley 25 on which the belt 22 runs is loose on the shaft 24 and rotates in opposite direction thereon. Tight and loose pulleys 26 and 27 on the shaft 24 accommodate the power belt, not shown, which may be driven from any suitable source, for instance, an electric motor, not shown.

When the object operated upon, for instance a cabbage 27, is lifted upward into engagement with the rotary cutter 10, the spindle 12 is displaced upward and the clutch 18 brought into engagement with the pulley 20 rotating in one direction. Upon the downward withdrawal of the cabbage 27, the spindle 12 is shifted downward and the clutch 19 engages the pulley 21, reversing the direction of rotation of the knife so that the core is cut in the opposite direction as the knife passes upward therethrough.

During the lifting and lowering operation, the cabbage is supported upon a carrier 28. This may be of any suitable construction, but is preferably made from a loop bar, the ends of which are adjustably connected to a belt 29 by means of lock nuts 20 working on the threaded legs of the bar. The belt 29 has a downwardly extending stem 31 which swivels in a bearing 32 at the outer end of the bracket arm 33, the base of which is clamped or otherwise suitably secured to a vertically reciprocating feed bar 34. The latter passes through guides 35 and 36 formed as offset flanges at opposite ends of a mounting plate 37 which may be secured by screws 38 to the standard 17. From the lower guide plate 36 are hung springs 39, which extend downward and are adjustably engaged at their lower ends to the cross head 40 at the lower end of the feed bar 34. At the upper end of the feed bar is a roller 41 bearing against the cam 42 mounted on a stub shaft 43 supported on the head frame 16. Fast on this shaft is a gear wheel 44 meshing with the pinion 45 on the main driving shaft 24. During the operation of the machine the cam 42 is constantly rotated through its drive connection with the shaft 24, and cooperating with the spring 39 imparts a vertical reciprocation to the feed bar 34, and thus to the supporting piece 28. In Fig. 1 the feed bar is in its uppermost position—that is to say, in the position in which the deepest cut is made by the knife 10. As the cam rotates, it depresses the feed bar, thus lowering the work support 28 against the action of the springs 39. The shape of the cam is such that the work support is held in its down position during the greater portion of the travel of the cam, thus permitting the attendant to remove the cut cabbage and to place another one in position for the operation of the cutter before the feed bar is again raised by the pull of the springs 39.

I prefer also to provide a guard 46 in the form of a loop bar which surrounds the shank of the cutter 10 and overlies the cutter blade. The guard plate 47, to which the ends of the bar 46 are secured, is pivoted at 48 upon a bracket 49 secured to the standard 17, so that it may swing upward with the cabbage as the latter is lifted by the bar 34 during the entry cut of the knife 10. While the guard may be permitted to follow the cabbage downward by gravity as the feed bar 34 moves downward, I prefer to provide a spring 50 to insure this movement of the guard.

An adjustable stop 51 on the guard carrier plate 47 limits the downward movement of the guard and holds it in protective position with respect to the cutter when the latter is exposed.

Various modifications of construction will readily occur to those skilled in the art, which do not depart from what I claim as my invention.

I claim—

1. In a cabbage cutter, a frame, a displaceable cutter spindle vertically arranged in the frame, driving pulleys rotatable in opposite directions on the spindle, means for driving the pulleys in opposite directions, and clutch means on the spindle for engaging one or the other of said pulleys upon the vertical displacement of the spindle, in combination with a cabbage support, and means for lifting and lowering the support to cause a cabbage thereon to engage and displace the spindle into engagement with one of said pulleys as the cabbage rises, and with the other of the pulleys as the cabbage descends.

2. The combination with a rotary cutter, of a pivoted work support, and cam controlled means for imparting vertical reciprocation to said work support for the purpose described.

3. In a cabbage cutter, a standard, a cutter head mounted at the upper end thereof, a vertical cutter spindle mounted in said cutter head and adapted to support a rotary cutter, means on said cutter head for driving said spindle, in combination with a cam driven by said spindle-rotating means, together with a work support associated with the cutter, and means controlled by said cam for vertically reciprocating said work support.

4. In a cabbage cutter, a supporting standard, a cutter head mounted thereon, a work support pivoted on a vertical axis and vertically slidable on said standard, and cam means driven from the cutter head for controlling the vertical reciprocation of the work support.

5. In a cabbage cutter, a standard, a cutter head supported thereon, a work support vertically slidable on said standard, spring means for lifting said work support, and cam means driven from the cutter head for depressing said work support.

6. In a cabbage cutter, a standard, a cutter head supported thereon, a work support vertically slidable on said standard, spring means for lifting said work support, and cam means driven from the cutter head for depressing said work support, in combination with a guard pivoted on said standard and associated with the cutter to prevent contact therewith when the cutter is exposed.

In testimony whereof I have signed my name to this specification.

HENRY BRUNKEN.